Aug. 24, 1965     R. A. RIGHTMIRE ETAL     3,202,546
ELECTROCHEMICAL REACTION APPARATUS
Filed April 17, 1961     4 Sheets-Sheet 4
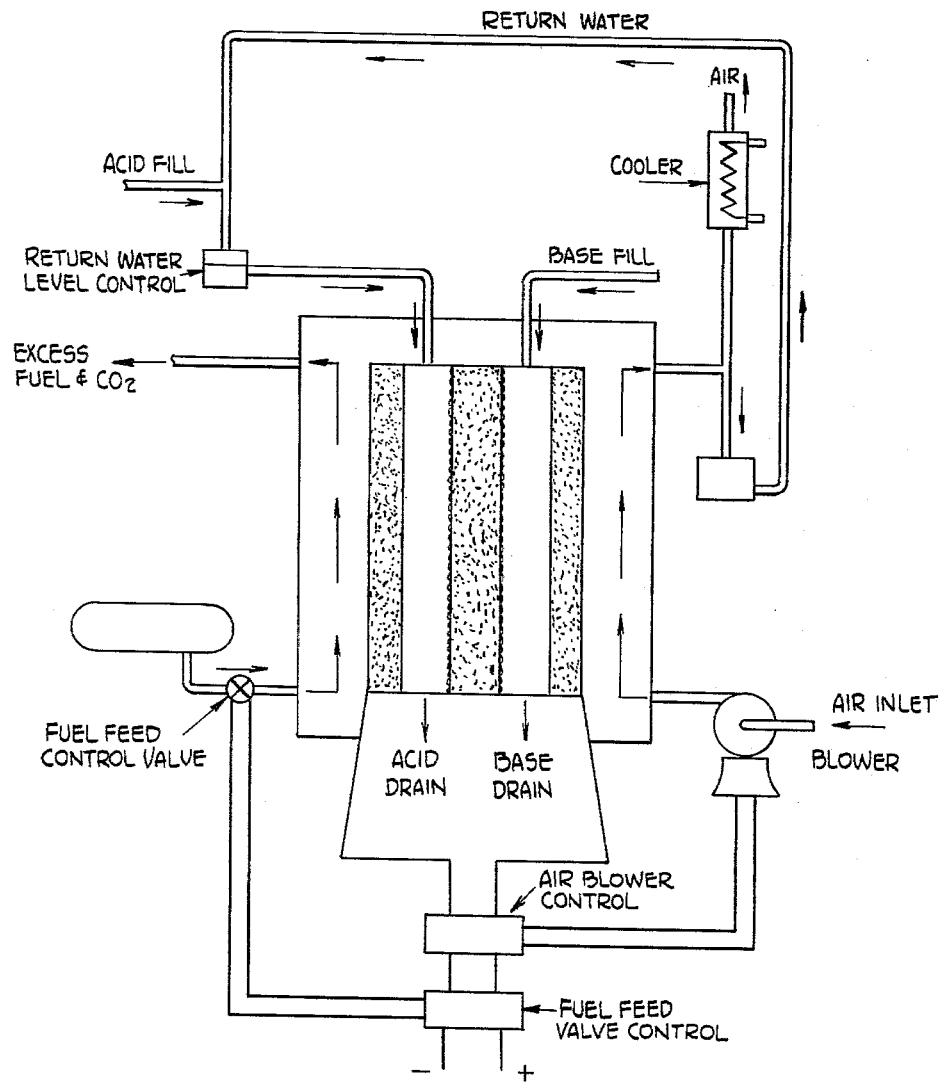
F1G. 5
INVENTOR.
PHILIP S. FAY
BY ROBERT A. RIGHTMIRE
Schramm, Kramer & Sturges
ATTORNEYS.

United States Patent Office
3,202,546
Patented Aug. 24, 1965

1

3,202,546
ELECTROCHEMICAL REACTION APPARATUS
Robert A. Rightmire, Twinsburg, and Philip S. Fay, Cleveland, Ohio, assignors to The Standard Oil Company, Cleveland, Ohio, a corporation of Ohio
Filed Apr. 17, 1961, Ser. No. 103,431
7 Claims. (Cl. 136—86)

This invention relates generally to an apparatus for directly converting one form of energy to another and more particularly relates to improvements in the structure and assembly of component parts of such apparatus. The principles of the invention, for exemplary purposes, will be described in reference to a fuel cell for directly converting chemical energy into electrical energy, it being understood, however, that these principles are applicable to other types of electrochemical reaction apparatus as well.

The direct conversion of chemical energy into electrical energy is accomplished by causing chemical reactions to take place between reactive materials at the junctures between spaced electron conductors and an intermediate ion transfer medium to form a continuous energy exchange system. The reactive materials are separately supplied to each juncture so that the charge exchange of the reaction takes place ionically through the ion conductor forming an internal circuit and electronically through the electron conductor forming an external circuit. Thus, where the reactive materials are continuously supplied and an electrical load is coupled to the external circuit it is possible to electrochemically convert the energy of chemical reaction directly into electrical energy in the external circuit.

Where, for exemplary purposes, hydrogen is employed as one of the reactive materials and oxygen as the other, the oxidation and reduction of these materials at the corresponding junctures between the electronic and ionic conductors generates electrical energy in the external circuit and produces water as a product of the reaction. When each of the reactive materials is continuously supplied and consumed within such an apparatus, it may be likened, respectively, to a fuel, and to an antifuel, the former of which is selected to yield electrons in its chemical reaction and the latter of which is selected to accept electrons.

In any such apparatus, the fuel and the antifuel are usually supplied in a relatively stable condition and some means is included for activating their conversion from such normally stable reactant state to their reaction product states. Such conversion of the fuel and antifuel is believed to take place by virtue of chemical adsorption to a chemisorbed state and desorption to their reaction product states at the corresponding junctures between the electron and ion conductors. However, such conversion is not normally nor partically self-motivating and is, therefore, preferably enhanced by the introduction of some means to promote adsorption at each juncture and some means in the ion-conducting medium which will promote desorption at each juncture. The reaction products may be readily removed from the apparatus in any convenient manner and preferably as they are formed.

In accordance with the exemplary application of the principles of this invention to a fuel cell, the electron conductors therein will be identified as electrodes and more specifically as the anode and cathode, respectively, depending upon whether they are on the fuel or the antifuel side of the cell. The fuel may be any substance which is oxidizable relative to the antifuel which in turn will be identified as any substance which is reducible relative to the fuel; where oxidation and reduction, respectively, contemplate the release and acceptance of electrons.

Further in accordance with the exemplary application

2 of the principles of this invention to a fuel cell, the medium which is capable of conducting an electrical charge associated with an atom or a group of atoms, i.e., ions, shall be referred to hereinafter as an ion-conducting medium. The ion-conducting medium serves principally to isolate the electronic conductors from each other in the internal circuit and as the transfer vehicle for the ionic-charge exchange. The junctures between the electrodes and the ion-conducting medium will be identified throughout as interfaces. The activating means for promoting the conversion of the fuel and the antifuel as hereinbefore noted from their reactant state through the chemisorbed state to the reaction product state will be more specifically identified in conjunction with their functional coaction in the cell as an adsorber.

The overall fuel cell reaction is an electrochemical reaction, the efficiency of which is limited in part by the structural configuration and manner of assembly of the operative cell components. Such limiting factors may also detract from the full utilization of the fuel cell in many applications where size and configuration are significant. These limitations are minimized in accordance with this invention by predetermined design and assembly in a manner which increases the overall reaction and thus the efficiency of conversion without materially increasing the size and volume of the cell.

In the annexed drawings:

FIG. 5 is a diagrammatic and schematic apparatus including the improved apparatus hereof.

Briefly stated, the present invention is in the provision of an improved electrochemical reaction apparatus having at least one pair of spaced electron conducting members, or electrodes. These are permeable to the electrochemical reactant materials which coact electrochemically within the apparatus to produce electrical energy. Disposed between such electrodes is an ion conducting medium which is comprised of a pair of gelled aqueous ion-containing and conducting media which are incompatible; i.e., if allowed to intermingle, their effectiveness in the environment of the apparatus is diminished either because of chemical interaction, loss of activity of one in the presence of the other, or other deleterious effect on the electrochemical reaction. The gelled media are maintained separate by a porous barrier member which is electronically conductive, e.g. platinized porous carbon.

The present invention provides a novel cell design which enables the utilization of the principle of transferring hydrogen, for example, from an acidic medium through a "hydrogen bridge" into a basic medium without the drawbacks of more complex hydrogen bridge structures. The structures which can be produced in accordance with the teachings of the present invention are especially adapted to a close stacked design which permits the compacting of a large number of electrochemical reaction units in a relatively small volume.

The principal feature of the present invention is the provision within the ion-transfer medium of a rigid porous separation medium having electrically conductive surface layers which are electrically connected. Alternatively, metal may be dispersed throughout the porous matrix to provide a porous electrically conductive barrier member. This permits, for example, a gelled acidic ion-containing and conducting medium to occupy the space between the porous solid separator and a fuel electrode on one side, a gelled basic ion-containing and conducting medium to lie between the porous separator and an antifuel electrode on the other side. The utilization of an acidic ion-containing and conducting medium insures freedom from buildup of carbonate on the fuel side of the cell when the fuel is a hydrocarbon, and the utilization of a basic ion-containing and conducting medium on the antifuel side of the cell permits the electrode process to proceed at optimum efficiency with a minimum formation of hydrogen peroxide when this antifuel includes oxygen.

Figure 1:
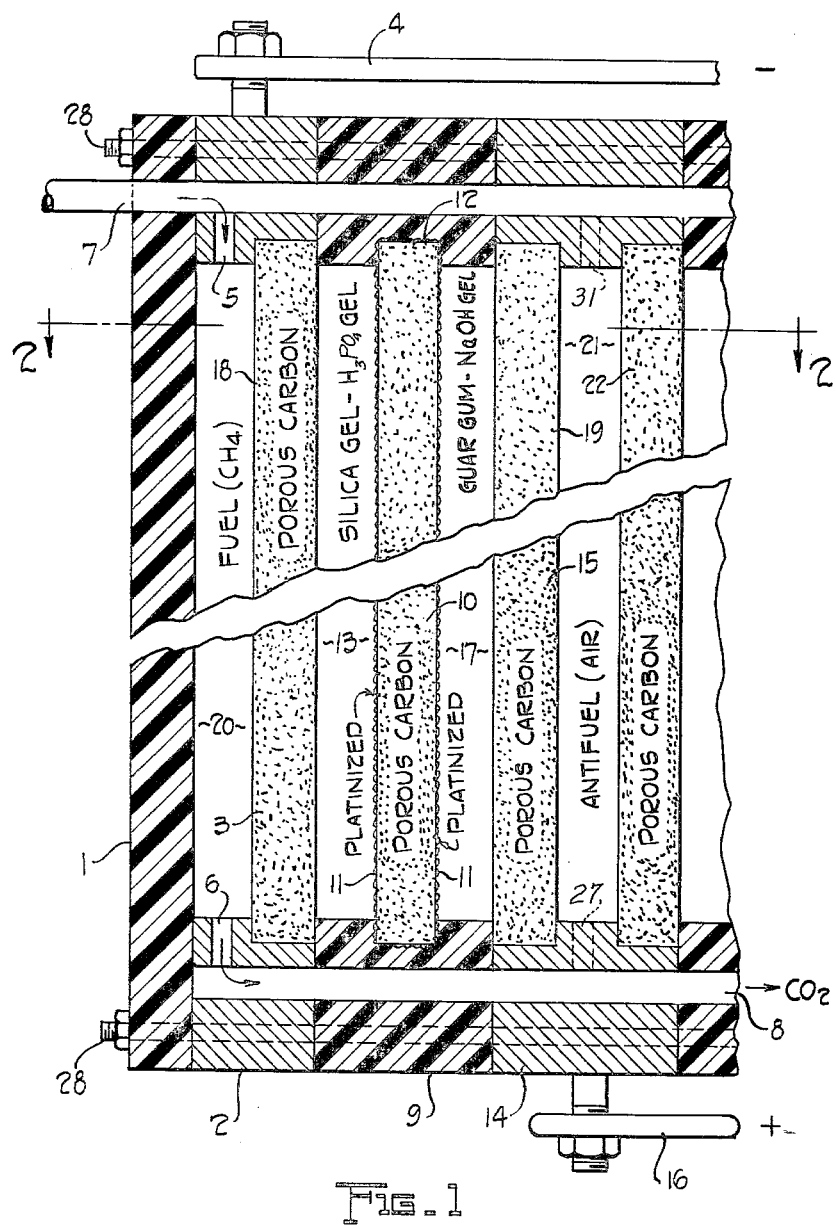
FIG. 1 is a partial cross-sectional view of an electrochemical reaction apparatus in accordance herewith.

FIG. 1 illustrates a portion of one embodiment of a fuel cell in accordance with the present invention. The portion shown in FIG. 1 is one end of a horizontally repeating multiple assembly of unit cells, and slightly more than one unit cell is shown in order to indicate a method of stacking a multiple assembly. There is provided an end plate 1 which closes off the end of the multiple assembly illustrated in FIG. 1. A corresponding end plate, not shown, is provided at the opposite end of the assembly. The end plate 1 may be constructed of any suitable physically solid material such as metal, impervious graphite, ceramic, plastic, hard rubber, etc. Where the end plate is composed of an electrically conducting material, suitable electrical insulating gaskets may be provided to isolate the end plate from the adjacent electrically conductive and active components of the fuel cell.

Adjacent the end plate 1 there is provided a fuel electrode frame 2 adapted to hold the fuel electrode 3 in the correct spatial relationship to the other cell components, and into which the electrode member 33 is conveniently rabbeted, as shown. The frame 2 provides an electrical connection to a negative bus bar 4 which is in turn adapted to be connected to an external electrical circuit, not shown. Frame 2 is also provided with a fuel inlet passage 5, and an exhaust passage 6 through which the fuel depleted products are exited from contact with the fuel electrode 3. Also passing through the frame 2 is a section of the fuel manifold 7 which carries fuel to other unit cells of the multiple assembly. The frame 2 is also adapted to carry a section of the exhaust manifold 8 which serves to carry away the chemical products of the fuel side of all of the unit cells, and any unused portion of the fuel. The fuel electrode frames 2 may be constructed of conducting material such as any metal or impervious graphite. If the electrode frame is constructed of a non-conductor, such as certain ceramic or plastic materials, means must be provided to supply a good electrical connection between the fuel electrode 3 and the external bus bar 4.

Figure 2:
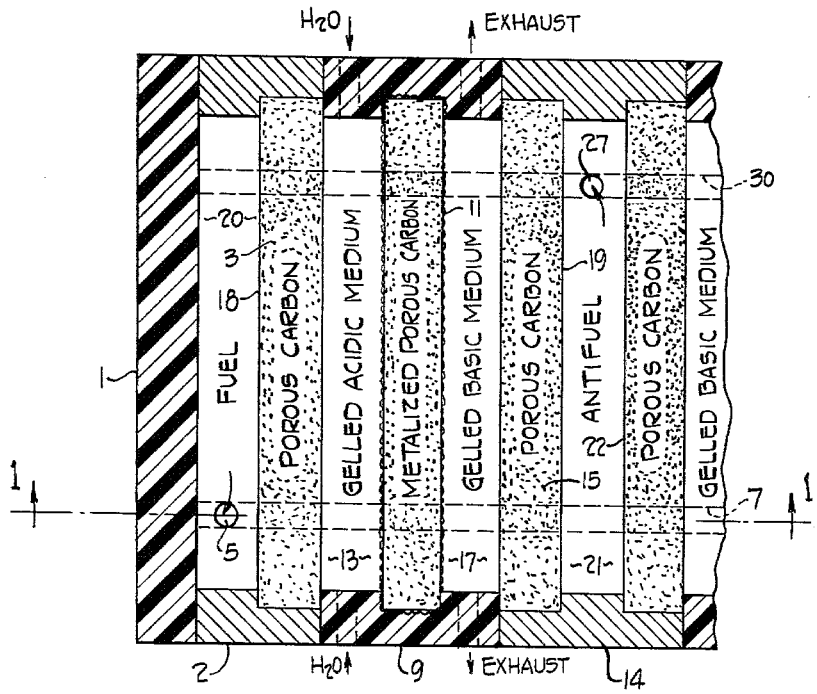
FIG. 2 is a cross-sectional view taken on the line 2—2 of FIG. 1.
Figure 4:
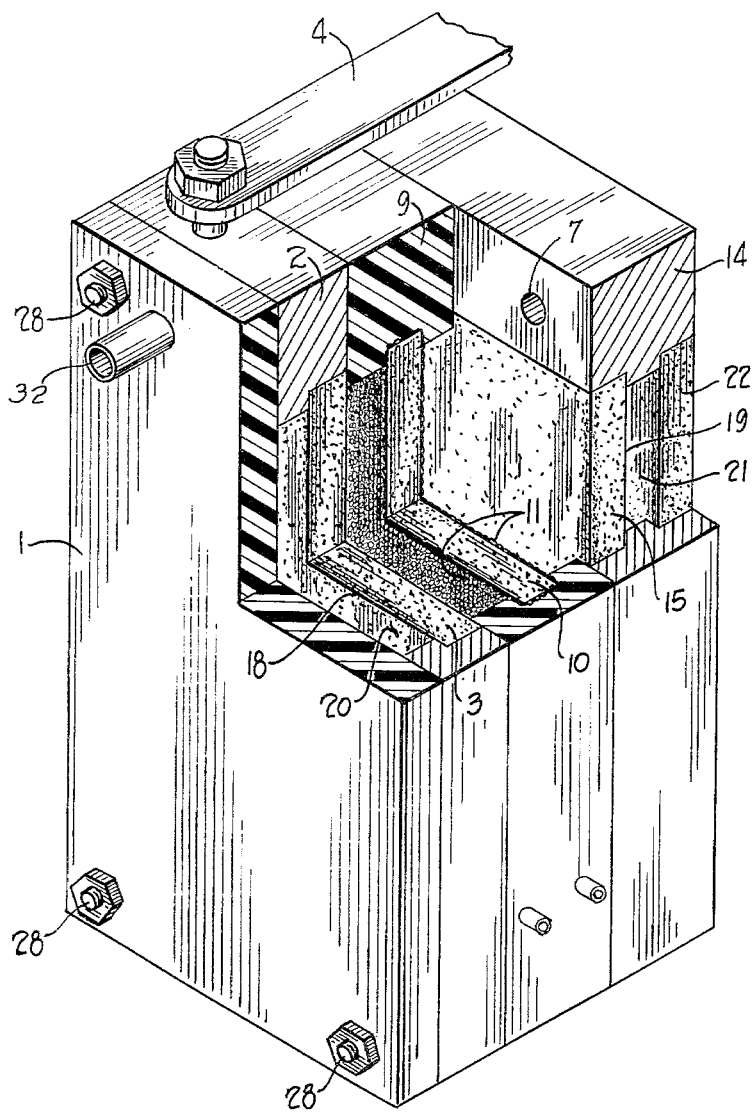
FIG. 4 is a partial isometric cut-away illustration of the cell of FIGS. 1 and 2.

The fuel electrode 3 may be constructed of a porous electrically illustrated in FIGS. 1, 2 and 4, it is fabricated example illustrated in FIGS. 1, 2 and 4, it is fabricated from a porous carbon plate. The porous carbon plate 3 is desirably water-proofed by treatment with a 5% solution of a petroleum wax melting at a temperature in excess of 180° F., in benzene followed by evaporation of the solvent. If desired, the fuel electrode 3 may also, before the water proofing treatment, be provided with a solid catalyst such as, for example, a mixture of nickel and lithium oxide, palladium or iridium metals or oxides, stannous oxide, and the like.

Proceeding inwardly from the end of the cell assembly and adjacent to the fuel electrode frame 2, there is provided a separator frame 9 which serves to hold a porous separator 10 in proper spatial relationship to the other cell components and into which the separator or barrier 10 is conveniently rabbeted, as shown. Separator frame 9 is also adapted to contain sections of the fuel manifold 7 and a section of the exhaust manifold 8. Separator frame 9 may be constructed of metal, impervious graphite, ceramic or plastic materials, for example, hard rubber. However, if separator frame 9 is made of an electrically conducting material, suitable electrical insulating gaskets must be provided to isolate it from the adjacent cell components. In the example shown in FIGS. 1, 2 and 4 separator frame 9 is fabricated from an injected molded plastic material which is resilient enough to serve as a gasket when the fuel cell sections are assembled and drawn together such as by bolt means 28. Separator 10 is constructed of porous material which is readily permeable to hydrogen gas.

If the porous separator 10 is constructed of a material which is not electrically conductive, surface layers 11 of electrically conductive material are applied, and the conducting surfaces are electrically connected by extending the surface treatment over the end 12 of the separator 10, or by the insertion of metal foil, rod or other means for electrically connecting the surfaces. In the embodiment shown in FIG. 1, the separator 10 is fabricated from a porous carbon plate which is platinized on the surfaces and then water proofed by treatment with a 5% solution of wax in benzene, followed by evaporation of the solvent.

Intermediate fuel electrode 3 and separator 10 there is provided a chamber 13 adapted to contain an ion-containing and conducting medium preferentially suited to the electrochemical reaction occurring at the interface between fuel electrode 3 and the ion-transfer medium. In the embodiment shown in FIG. 1, the ion-containing and conducting medium is a gelled aqueous acidic solution, and in this particular embodiment is composed of 6 normal phosphoric acid. Water inlet and exhaust passages, shown in FIG. 2 in the separator frame 9 provide means for introducing and withdrawing the ion-containing and conducting medium from the chamber 13 and adjusting the water content of the ion transfer medium. The acidic ion-containing and conducting medium may consist of various concentrations of any acidic materials, or aqueous solutions of various salts, such as stannuous chloride, which is especially adapted for promoting the electrochemical reaction occurring at the interface between the fuel electrode 3 and the ion-containing and conducting medium disposed in chamber 13. Gelation of the ion-containing and conducting medium assists in retaining it in position within the chamber 13 and reduces penetration into the fuel electrode 3 and into the separator 10. Suitable gelling agents may be inert solids like silica gel, bentonite clay, alumina, unreacted powders or fibers, or organic gelling agents such as sodium alginate and guar gum. Silica gel in concentrations of from 5% to 10% by weight may be used to form suitable gels with the ion-containing and conducting medium of the present example.

Adjacent the separator frame 9 is an antifuel electrode frame 14 which serves to hold the antifuel electrode 15 in the proper spatial relationship to the other cell components, and provide electrical connection to the positive bus bar 16 which is in turn connected to the external circuit, not shown. The antifuel electrode 15 is conveniently rabbeted into the frame 14, as shown. The antifuel electrode frame 14 also contains passage 31 to conduct the antifuel to the electrode and passage 27 to conduct the antifuel depleted materials away from the antifuel electrode. Frame 14 also contains a section of manifold 32 (FIG. 4) which is parallel to the fuel manifold 7 which carries antifuel to the other unit cells of the multiple assembly, and a section of a manifold 30, FIGURE 2, which parallels the fuel exhaust manifold 8, which carries away the chemical product from the antifuel side of all of the unit cells. The antifuel electrode frames 14 may be constructed of a conducting material such as metal or impervious graphite. In the case that the electrode frame is constructed of a non-conductor, such as certain ceramic or plastic materials, means must be provided such as the insertion of a metal strip or rod, to supply a good electrical connection between the electrode 15 and the external bus bars 16.

Antifuel electrode 15 may be constructed of a porous electrically conducting material and, in the embodiment shown in FIGS. 1, 2 and 4 it is fabricated from a porous carbon plate. The porous carbon plate is desirably water proofed by treatment with a 5% solution of wax and benzene followed by evaporation of the excess solvent. If desired, antifuel electrode 15 may also, before the water proofing treatment, be provided with a surface catalyst such as platinum, platinized nickel, silver or manganese metals or oxides.

Intermediate to the antifuel electrode 15 and the separator 10 there is provided a chamber 17 adapted to contain an ion-containing and conducting medium which in the embodiment shown, is preferentially suited to the electrochemical reaction at the reactive interface of electrode 15 and which is chemically incompatible with the ion-containing and conducting medium disposed in chamber 13. In the embodiment of FIGS. 1, 2 and 4, the ion-containing and conducting medium in chamber 17 is a gelled basic material and may consist of suitable concentrations of any basic materials for carrying out the production of hydroxyl ions from oxygen at the interface between the antifuel electrode 15 and the ion-containing and conducting medium disposed in chamber 17. By way of example, the ion-containing and conducting medium may be composed of 6 normal sodium hydroxide. A suitable gelling agent is guar gum which in concentrations as low as from 1% to 3% by weight provides a suitable gel for the basic ion-containing and conducting medium.

Surfaces 18 and 19 of the fuel electrode 3 and the antifuel electrode 15, respectively, are exposed to fuel chamber 20 and antifuel chamber 21 provided and adapted to distribute the fuel and antifuel, respectively, evenly over the surfaces of the porous electrodes. It will be noted that antifuel chamber 21 has an antifuel electrode 15 of the first unit cell on one side and an antifuel electrode 22 of the second unit cell on the other side illustrating the back-to-back relationship in which the individual unit cells are combined in the horizontally repeating multiple assembly. The whole assembly is held together by longitudinal bolts 28 passing through the electrode and the separator frames.

Figure 3:
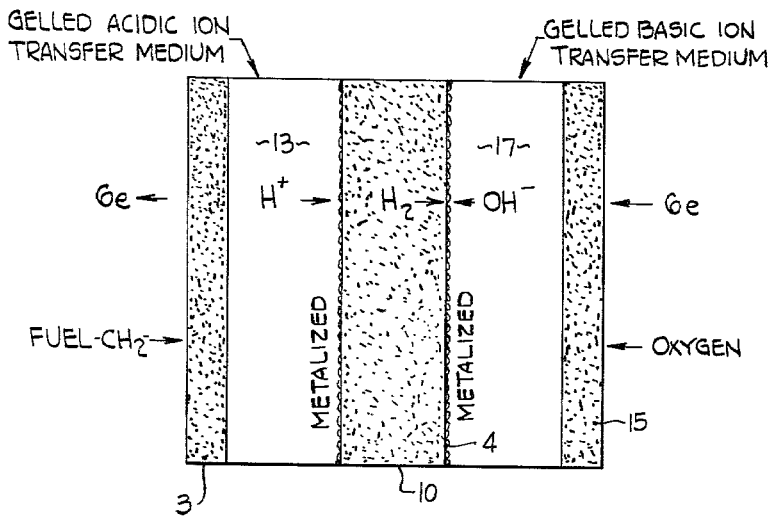
FIG. 3 is a diagrammatic representation of the processes believed to occur within an apparatus in accordance herewith.

FIG. 3 shows in diagrammatic form essential elements of a fuel cell such as that shown in FIGS. 1, 2 and 4. A hydrocarbon fuel, designated by the generalized formula —CH$_2$— for purposes of this discussion, enters the fuel inlet 5 from the fuel manifold 7 by which it is distributed to the various unit cells of the multiple assembly. The hydrocarbon fuel diffuses through the porous fuel electrode 3 and reacts at the fuel electrode-acidic ion-containing and conducting medium interface according to the equation:

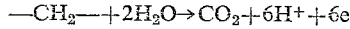

$$-CH_2- + 2H_2O \rightarrow CO_2 + 6H^+ + 6e$$

As indicated in FIG. 3, the hydrogen ions formed by this reaction are conducted across the acidic ion-containing and transfer medium in chamber 13 to the metallized surface 11 of the separator 10, and react thereat according to the equation:

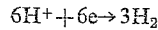

$$6H^+ + 6e \rightarrow 3H_2$$

As indicated within the separator 10, the gaseous hydrogen permeates the porous separator 10 and travels to the surface of the separator 10 adjacent the gelled basic ion-containing and conducting medium in chamber 17 where it reacts according to the equation:

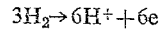

$$3H_2 \rightarrow 6H^+ + 6e$$

The electrons so released are conducted through the electronic conducting portion of separator 10, and are available at the opposite interface where the hydrogen is converted in the ionic form. Oxygen from air enters the antifuel inlet through manifold 30 and passage 27 in the antifuel electrode frame 14, diffuses through the antifuel electrode 15 and reacts at the antifuel electrode-basic ion-containing and conducting medium interface according to the equation:

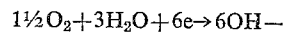

$$1\tfrac{1}{2}O_2 + 3H_2O + 6e \rightarrow 6OH-$$

The hydroxyl ions generated at the interface are conducted through the basic ion-containing and conducting mediums in chamber 17 to the metalized surface 11 of the separator 10 where it undergoes reaction with the hydrogen ions regenerated at this surface as aforesaid to form water. The electrons generated by the reaction at the fuel electrode are transmitted to the negative bus bar 4, and returned to the antifuel electrode through the positive bus bar 16 to complete the external electrical circuit.

The operating conditions for the multiple cell assembly shown in FIGS. 1 and 2 are atmospheric pressure in the temperature range of from 50° to 100° C., preferably near the upper limit of the temperature range depending upon the boiling point of the ion-containing and conducting media and the resistance of the structural pores of the fuel cell to chemical attack. As a practical matter, certain additional external equipment may be employed for the economic commercial operation of such a fuel cell assembly, and this auxiliary equipment is illustrated schematically in FIG. 5. It is evident from reference to the overall half-cell reactions outlined above that water is consumed from the acidic gelled ion-containing and conducting medium and generated in the basic gelled ion-containing and conducting medium. FIG. 5 shows that the exhaust gases from the antifuel side of the fuel cell assembly are passed through a cooler to condense water from the excess air and nitrogen, and the water then returned to the acidic ion-containing and conducting medium at a rate regulated by a liquid level controller to replace the water that has been consumed. The blower, which supplies the air to the antifuel electrodes and the fuel feed control valve which regulates the rate of hydrogen hydrocarbon feed to the fuel electrode are both controlled as indicated in FIG. 5 by the electrical output of the cell so that the chemical material fed to the fuel cell is always commensurate with the electrical current demand upon the fuel cell.

There has thus been provided an improved electrochemical reaction apparatus which utilizes an acidic ion-containing and conducting medium of the gelled type at the fuel electrode and a basic ion-containing and conducting medium of the gelled type at the antifuel electrode. The desirability of the use of a basic ion-containing and conducting medium at the antifuel electrode derives from the fact that the basic medium tends to promote decomposition of peroxide intermediates which would otherwise restrict the available potential at that electrode and consequently reduce cell efficiency. The concurrent advantage of being able to utilize the two ion-containing and conducting media in combination with the porous separator member to constitute an ion-transfer medium, lies with the use of the acidic ion-containing and conducting medium in conjunction with the fuel electrode. In this case, the carbon dioxide produced at the electrode during the electrochemical reaction readily passes out of the acidic ion-containing and conducting medium. If a non-acidic ion-containing and conducting medium were utilized, in conjunction with the fuel electrode, the carbon dioxide produced in the fuel electrode electrochemical reaction would form carbonates which would gradually build up in concentration and progressively reduce the fuel cell efficiency.

Another advantage of the apparatus of this invention is that there is no net consumption of either the acidic or basic gelled ion-containing and conducting media by cross-cell diffusion or otherwise. As long as the water balance is maintained by the method described, an indefinitely stable system is available. Additionally, the movement of the gaseous hydrogen through the porous separator is not impeded in any way as might be the case with other types of barriers so that there is no opportunity for concentration gradients to be built up to reduce the efficiency of the fuel cell.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In an electrochemical reaction apparatus for the production of electrical energy from the electrochemical interaction of two separate, gaseous reactants,
   support means,
   a pair of porous electrodes carried by said support means in spaced relationship to one another and each of said electrodes being respectively permeable to one of said gaseous reactants, and having exposed external surfaces, and internal surfaces in facing, spaced relationship,
   a porous, electrolyte-repellant, electronically-conducting, ion-impermeable barrier having catalytically active surfaces positioned in spaced relationship between said interior surfaces of said electrodes,
   a gelled, aqueous, acidic, ion-containing and conducting medium in contact between said porous electronically conducting barrier and one of said electrodes,
   a gelled, aqueous, basic, ion-containing and conducting medium in contact between said porous electronically conducting barrier and the other of said electrodes,
   means for supplying said electrochemical reactants respectively to said exposed surfaces of said electrodes,
   and means for exhausting products of electrochemical interaction away from said electrodes.

2. The invention of claim 1, wherein the porous electronically-conducting barrier is porous carbon.

3. The invention of claim 1, wherein the porous electronically-conducting barrier is metallized for conductivity.

4. The invention of claim 1, wherein the porous electronically-conducting barrier is platinized porous carbon.

5. In an electrochemical reaction apparatus for the production of electrical energy from the electrochemical interaction of two separate gaseous reactants,
   a plurality of cell units each comprising,
   a support,
   a pair of porous electrodes carried by said support in spaced relationship to one another and each of said electrodes being respectively permeable to one of said gaseous reactants and having exposed external surfaces, and internal surfaces in facing, spaced relationship,
   a porous electronically-conducting barrier having catalytically active surfaces positioned in spaced relationship between said internal surfaces of said electrodes,
   a gelled, aqueous, acidic, ion-containing and conducting medium in contact between said porous electronically-conducting barrier and one of said electrodes,
   a gelled, aqueous, basic, ion-containing and conducting medium in contact between said porous electronically-conducting barrier and the other of said electrodes,
   said barrier being impermeable to each of said gelled media, but permeable to hydrogen,
   means for supplying said electrochemical reactants respectively to said exposed surfaces of said electrodes,
   and means for exhausting products of electrochemical interaction away from said electrodes.

6. In an electrochemical reaction apparatus for the production of electrical energy from the electrochemical interaction of a gaseous, carbon-containing fuel reactant and a gaseous, oxygen-containing antifuel reactant,
   support means,
   a porous fuel electrode and a porous antifuel electrode carried by said support means in spaced relationship to one another and each being respectively permeable to said gaseous fuel reactant and said gaseous antifuel reactant,
   said electrodes each having exposed external surfaces, and internal surfaces in facing relation,
   a porous electronically-conducting barrier of platinized porous carbon positioned in spaced relationship between said internal surfaces of said electrodes, said barrier being waterproofed,
   a gelled, aqueous, acidic, ion-containing and conducting medium in the space between said fuel electrode and said barrier,
   a gelled, aqueous, basic, ion-containing and conducting medium in the space between said antifuel electrode and said barrier,
   means for supplying gaseous fuel and antifuel feed materials to said fuel and antifuel electrodes respectively,
   and means for exhausting products of electrochemical interaction away from said electrodes.

7. The invention of claim 6, wherein said gelled, aqueous, acidic, ion-containing and conducting medium is 6 N phosphoric acid and said gelled, aqueous, basic, ion-containing and conducting medium is 6 N sodium hydroxide.

References Cited by the Examiner

UNITED STATES PATENTS

| 2,700,063 | 1/55 | Manecke | 136—86 |
| 3,092,516 | 6/63 | Rightmire | 136—86 |

FOREIGN PATENTS 844,584   8/60   Great Britain.

JOHN H. MACK, *Primary Examiner.*

JOHN R. SPECK, MURRAY TILLMAN, *Examiners.*

UNITED STATES PATENT OFFICE
CERTIFICATE OF CORRECTION

Patent No. 3,202,546

August 24, 1965

Robert A. Rightmire et al.

It is hereby certified that error appears in the above numbered patent requiring correction and that the said Letters Patent should read as corrected below.

Column 2, line 54, for "borous" read -- porous --; column 3, line 33, for "33" read -- 3 --; line 54, for "illustrated in FIGS. 1, 2 and 4, it is fabricated" read -- conducting material, and in the particular --; column 6, lines 3 and 4, in the equation, for "6OH-" read -- 6OH⁻ --.

Signed and sealed this 16th day of August 1966.

(SEAL)
Attest:

ERNEST W. SWIDER
Attesting Officer

EDWARD J. BRENNER
Commissioner of Patents